Figure 1:
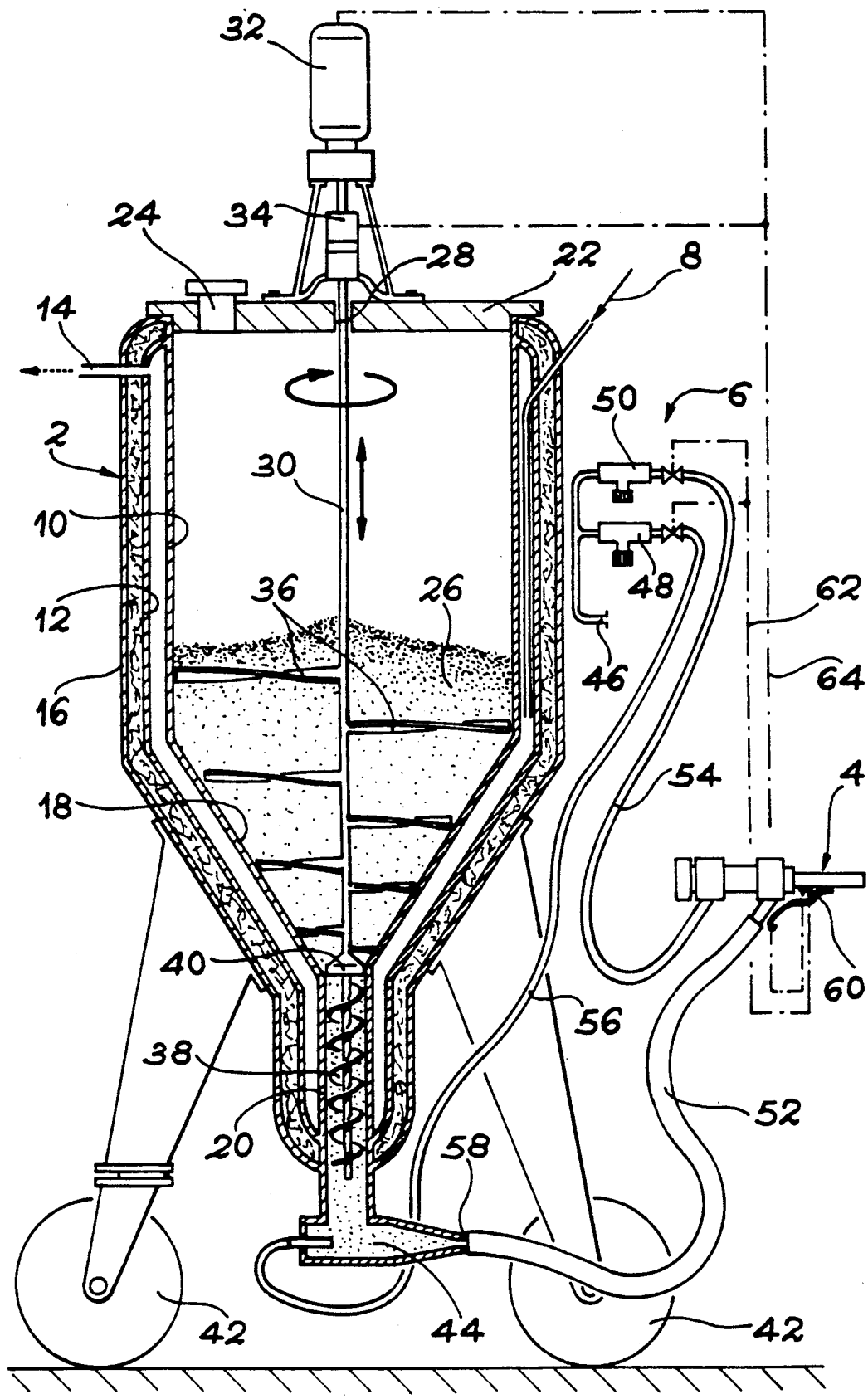

United States Patent
Manificat

[19]

[11] Patent Number: 5,319,946
[45] Date of Patent: Jun. 14, 1994

[54] APPARATUS FOR STORING AND TRANSPORTING ICE BALLS, WITHOUT ANY STICKING THEREOF, FROM THEIR PLACE OF PRODUCTION TO THEIR PLACE OF USE, WHERE THEY ARE PROJECTED ONTO A TARGET

[75] Inventor: André Manificat, Grenoble, France

[73] Assignee: Commissariat a l'Energie Atomique, Paris, France

[21] Appl. No.: 997,562

[22] Filed: Dec. 28, 1992

[51] Int. Cl.$^5$ .................... B08B 7/00; F25C 1/00; F25D 3/10

[52] U.S. Cl. .................... 62/342; 62/459; 51/320; 51/322; 134/7

[58] Field of Search .......... 62/342, 451, 459, 59, 62/62; 51/320, 322, 346; 134/7; 222/345, 346, 368

[56] References Cited

U.S. PATENT DOCUMENTS

| | | | |
|---|---|---|---|
| 2,699,403 | 1/1955 | Courts | 117/47 |
| 3,067,591 | 12/1962 | Lingle | 62/344 |
| 3,089,775 | 5/1963 | Lindall | 51/320 |
| 3,251,512 | 5/1966 | Irving | 222/232 |
| 3,702,519 | 11/1972 | Rice et al. | 51/320 X |
| 4,013,196 | 3/1977 | Hines, Jr. | 222/231 |
| 4,038,786 | 8/1977 | Fong | 51/320 |
| 4,389,820 | 6/1983 | Fong et al. | 51/320 X |
| 4,655,847 | 4/1987 | Ichinoseki et al. | 134/7 |
| 4,707,951 | 11/1987 | Gibot et al. | 51/320 X |
| 4,924,643 | 5/1990 | Buiquez et al. | 51/320 |
| 4,932,168 | 6/1990 | Tada et al. | 51/322 X |
| 4,947,592 | 8/1990 | Lloyd et al. | 51/436 |
| 4,965,968 | 10/1990 | Kelsall | 51/320 X |
| 5,071,289 | 12/1991 | Spivak | 406/11 |
| 5,147,466 | 9/1992 | Ohmori et al. | 134/7 |
| 5,203,794 | 4/1993 | Stratford et al. | 51/322 X |

FOREIGN PATENT DOCUMENTS

| | | |
|---|---|---|
| 201777 | 4/1986 | European Pat. Off. |
| 2923672 | 12/1980 | Fed. Rep. of Germany |
| 1570506 | 5/1969 | France |

*Primary Examiner*—Henry A. Bennett
*Assistant Examiner*—C. Kilner
*Attorney, Agent, or Firm*—Kerkam, Stowell, Kondracki & Clarke

[57] ABSTRACT

Apparatus for the storage and projection of ice balls comprising in combination:
 a revolving tank terminated by an opening in the lower part for linking with a ball injection chamber (44) to which are fixed:
 a) a motor (32) able to rotate an axial rod (30) equipped with mixing or stirring blades (36) of an Archimedean screw (38) and, between the two, a means for sealing the passage of the balls (40),
 b) a jack (34) able to control a translation of the axial rod (30),
 a gun (4) for projecting the balls and connected to the outlet (58) of the injection chamber,
 a compressed air source (6),
 on the gun, a double contact trigger (60), the first contact of which controls the injection of air and the second contact controls the raising jack (34) of the axial rod (30) and the rotation of the motor (32).

1 Claim, 2 Drawing Sheets

APPARATUS FOR STORING AND TRANSPORTING ICE BALLS, WITHOUT ANY STICKING THEREOF, FROM THEIR PLACE OF PRODUCTION TO THEIR PLACE OF USE, WHERE THEY ARE PROJECTED ONTO A TARGET

The present invention relates in general terms to the treatment of surfaces by the impact of solid particles, which are projected, hurled, blasted or shot under pressure onto the surface to be treated. It more particularly relates to such a treatment performed with the aid of ice balls. The latter term is used within the scope of the present invention to refer to any body which is solid at low temperature and which can sublimate or become liquid at normal temperature, such as e.g. ordinary damp ice or dry ice.

Various methods are known for cleaning surfaces by the projection of particles under pressure. For example, for this purpose use is made of sand blasting, or the blasting of other materials, such as corundum, iron shot or polyethylene balls.

All these methods are effective with respect to the cleaning action, but suffer from the disadvantage of leaving behind a contaminated or polluted residue, which occupies a large volume and which consequently requires specific removal means.

This is why consideration has been given to the use of particles or a frozen liquid, such as e.g. water in the form of ice balls, because the interest of the latter is that they melt and the resulting liquid evaporates only leaving behind very little solid residue.

However, the use of ice balls for blasting or projection for surface cleaning purposes causes certain problems, because it has hitherto been necessary to produce these ice balls at the place of use, or at least at a short distance therefrom. Thus, the transportation of such balls in pipes considerably increases the energy necessary for their propulsion, which is the cause or pressure drops in the pipes and consequently to an increase in the treatment costs. It is also known that ice balls have a natural tendency when collected in a container or agglomerating or sticking to one another under the effect or pressure, so as to form a compact mass, which cannot be subsequently used for projection with a gun. In addition, the hitherto conceived systems, including those forming the subject matter or FR-A-88 05692 of 28.4.1988, have a particularly difficult setting and utilization.

The present invention relates to an apparatus permitting the storage and transportation of the ice balls from their production location up to their place of use, as well as the projection thereof onto the surface to be treated, whilst allowing their maximum fluid flow without sticking together from the storage tank.

This storage and projection apparatus is characterized in that it has in combination:
  a triple wall (internal, median and external) revolving tank for the storage or the ice balls, the space between the internal wall and the median wall constituting an enclosure for a refrigerating liquid gas, the space between the median wall and the external wall being under a vacuum and filled with a thermal insulant, said tank being terminated towards the bottom by a conical and then cylindrical part open in its lower portion in order to communicate with a ball injection chamber, whilst being closed in its upper portion by an insulating cover having a filling orifice and to which are fixed:
  a) a motor able to rotate an axial rod equipped, in the conical part, with mixing or stirring blades and in the cylindrical part with an Archimedean screw, whose pitch is such that it opposes the descent of the balls by gravity when rotated by the motor and, between the two, a means for sealing the passage of the balls between the conical part and the cylindrical part,
  b) a jack able to control a translation of the axial rod along its length in order to displace the sealing means between a bottom position sealing the passage of the balls and a top position opening said said passage,
  a gun for projecting the balls by compressed air action, whose inlet of the pipe is connected to the outlet of the injection chamber,
  a compressed air source supplying the air at two pressures, one being low and the other high, the low pressure compressed air being supplied by a first duct to the inlet of the injection chamber and the high pressure compressed air being supplied by a second duct to the inlet of the gun,
  on the gun, a double contact trigger, whereof the first contact controls the injection of the low and high pressure compressed air and whereof the second, which is operable subsequent to the first, controls the jack for raising the axial rod and the rotation of the motor.

The storage apparatus as described hereinbefore has all the means necessary for achieving the objective consisting of being able to blast or project ice balls onto a surface to be treated and which is remote from the place of production of these balls. Thus, the triple wall tank makes it possible to maintain the balls protected from heat. It is internally equipped with means for stirring these balls (blades), so as to prevent the agglomeration thereof by sticking and so as to bring about the advance thereof towards the lower part of the tank, whilst still maintaining a possibility of sealing the passage level with the transition between the conical part and the cylindrical part. The Archimedean screw, which is integral in rotation with the axial rod, rotates so as to slow down the advance or the ice balls by gravity from the storage container to the injection chamber. Operating in this way, the Archimedean screw provides a descending path for the balls whilst bringing about their "fluidization" when they enter the injection chamber. It also makes it possible to regulate the flow rate of the ice balls because, the faster the motor turns, the lower the flow rate of the balls.

The injection chamber also has an important function, because the flow of the balls between the tank and the supply pipe of the gun could not take place without it. It is the place for adapting the transfer pressure of the balls, which can be regulated in this way to values between 1 and 3 bars in order to take account of the pressure drop due to the length of the supply pipe. According to the invention, in each case of use, the pressure in the injection chamber is adapted to the length of the gun supply pipe.

The triple wall storage tank has a size compatible with the fact that it can be made mobile, e.g. by using a system of small wheels or rollers, and can easily be transported between the production location where it is filled with ice balls and the projection location, where said balls are projected onto the surface to be cleaned.

Moreover, the projection gun with its two-contact trigger enables the operator to directly and successively control the arrival of compressed sir for propelling the balls and the opening of the sealing means, as well as the rotation of the axial rod, which drives both the mixing blades and the Archimedean screw.

According to the invention, the means for sealing the lower part of the storage tank can be in any known form, e.g. a passage sealing cone or disk.

This apparatus has the advantage of operating with respect to the storage part at atmospheric pressure and for the transfer—propulsion part at a pressure compensating the pressure drops in the ducts (below 2 bars). This makes it possible to solve significant technological problems and offer a very significant manoevrability of the pipe—gun system for the user. The installation of the pneumatic motor and jack controls enables the insertion of the apparatus in all workshops where there is a presence of moisture, without causing any problems as regards safety. Rapid fitting connections by means of collars permit the change to take place in a very short time of said nozzle/gun assembly when use occurs with very high flow rates. The apparatus fitted on small wheels is mobile and only has one high pressure coupling for its putting into operation. Despite its originality, it is subject to no more constraints than a conventional sandblasting apparatus.

The invention is described in greater detail hereinafter relative to a non-limitative embodiment and with reference to the attached drawings, wherein show:

FIG. 1—A diagrammatic overall view of the apparatus, in which the triple wall reservoir is shown in axial section.

Figure 2:
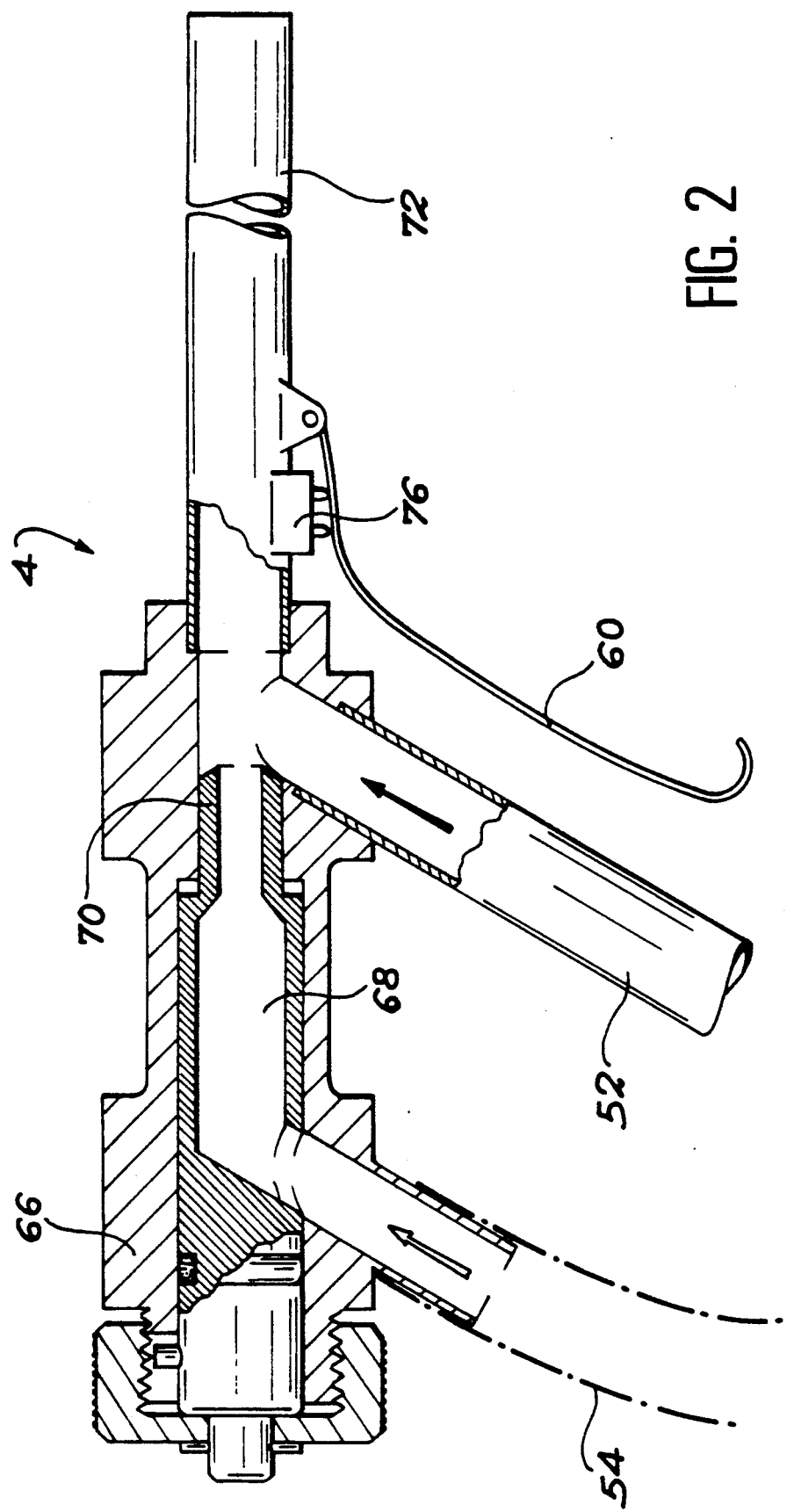

FIG. 2—A diagram showing the construction of the projection gun.

The apparatus for the storage and projection of ice balls essentially comprises, as can be seen in FIG. 1, a triple wall revolving cylinder 2, a projecting or blasting gun 4 and a compressed air source 6.

In the embodiment described, the triple wall tank 2 has a cylindroconical shape and is made from 1 mn thick stainless steel sheeting with a volume capacity of the internal tank of approximately 200 liters for the storage of the ice balls. The internal surface has a mirror finish in order to prevent thermal transfers and it is kept at a very low temperature by the introduction by means of a stainless steel plunger tube 8 of a cryogenic liquid. e.g. liquid nitrogen, into the space between the internal wall 10 and the median wall 12. This space issues to the exterior by a vent 14 located in the upper part of the tank and which links it with the external atmosphere.

The second space between the median wall 12 and the external wall 16 insulates the assembly with respect to the ambient temperature as a result of the fact that it is kept under vacuum and filled with an insulant, such as e.g. polyurethane foam. The internal tank constituted by the wall 10 is extended by a conical part 18 and then by a cylindrical part 20 having a length of 150 mm and a diameter of approximately 50 mm.

In the upper part, the tank 2 is sealed by a double-wall cover 22 and is also filled with an insulant. This cover 22 has two orifices, whereof one orifice 24 is used for the filling of the tank with the ice balls 26 and the other 28 having a diameter of approximately 25 mm permits the passage of an axial rod 30 connected to a motor 32, as well as a jack 34 for controlling the lengthwise translation of the axial rod 30. According to the invention, the assembly of the motor 32 and the jack 34 is integral with the cover and can be removed therewith merely by raising. In its entire conical part 18, the axial rod 30 has mixing or stirring blades 36, whilst in its cylindrical part 20 it has an Archimedean screw 38, whose function will be explained hereinafter.

Between the two, i.e. at the entrance or inlet of the cylindrical part 20 is provided a sealing means 40 which, according to the upward or downward translation state of the axial rod 30, permits the opening or closing of the passage for the ice balls from the upper part of the tank 1 to the Archimedean screw 20. This sealing means can be of a random known nature and can e.g. be a stainless steel circular plate or a sealing cone.

In the embodiment described, the storage apparatus is installed on small wheels 42 ensuring the easy transportation thereof.

The extension of the internal wall 10, following the cylindrical part 20, issues to the exterior of the tank 2 into an injection chamber 44 from which the ice balls are passed by compressed air into the projection or blasting gun 4.

According to the invention, a general compressed air supply 6 is provided in the vicinity of the apparatus and has, as from a single general supply 46, two pressure expansion valve—sealing valve systems, whereof the first 48 supplies air at low pressure, e.g. 1 to 3 bars, and whereof the second 50 supplies compressed air at high pressure, e.g. 3 to 20 bars.

The balls passing out of the injection chamber 40 are carried by the transfer duct 52 up to the gun 40. The latter receives high pressure compressed sir from the system 50 by the duct 54. Moreover, low pressure compressed air from the system 48 is supplied by the duct 56 to the entrance of the injection chamber 44 positioned opposite the starting point of the duct 58. In the embodiment described, the injection chamber 44 is T-shaped and has three openings, whereof the upper opening receives the balls transmitted by the Archimedean screw 38, whereof the rear lateral opening receives the low pressure compressed air through the duct 56 and whereof the injection opening 58 issues directly into the duct 52 for transferring the balls to the gun 4.

According to one or the very interesting features of the present invention, the control of the complete apparatus can take place by means or a double contact trigger 60 on the gun. Thus, when the user presses the trigger, the operation of the first contact as a result of the pneumatic control circuit 62 places under high or low pressure the ducts 54 and 56 used for the transportation and projection of the ice balls. On operating the second contact, after operating the first, the control 64, shown in dotted line form in FIG. 1, acts both on the jack 34, which by raising the axial rod 30 frees the opening 40 and leads to the advance of the balls towards the bottom of the tank 2. The same control circuit 64 starts up the pneumatic motor 32 and consequently the rotation of the axial rod 30. As a result the ice balls are mixed or stirred by the blades 36 so as to prevent any arching phenomenon in the tank and so as to rotate the Archimedean screw 38, so that the ice balls advance towards the injection chamber 44 and then through the duct 52 to the gun 4.

FIG. 2 shows on a larger scale the gun 4, whereof the body 66 and the injection chamber 68 terminated by the nozzle 70 located in the axis of the barrel 72 are clearly visible. The high pressure compressed air enters the chamber 68 by the duct 54 and the balls arrive by means of the tube 52. FIG. 2 also shows the trigger 60 and the double pneumatic contact 76 for respectively actuating, as explained, the pneumatic circuit and then the assembly constituted by the motor 32 and the jack 34.

A storage apparatus of the type described has been used for removing paints, deburring plastics materials, as well as the cleaning and degreasing of aircraft engine parts, nuclear decontamination of various materials, etc.

I claim:

1. Apparatus for storage and transfer of ice balls without any sticking of said ice balls from a place of production up to a place of use, where said ice balls are projected onto a target, characterized in that said apparatus comprises in combination:

a triple wall revolving tank (2) for the storage of said ice balls, said triple wall comprising an internal wall (10), a median wall (12) and an external wall (16), a space between the internal wall and the median wall constituting an enclosure for a refrigerating liquid gas, the space between the median wall and the external wall being under a vacuum and filled with a thermal insulant, said tank being terminated towards the bottom thereof by a conical part (18) and then a cylindrical part (20) open in its lower portion in order to communicate with a ball injection chamber (44) while being closed in the upper portion thereof by an insulating cover (22) having a filling orifice (24) and to which are fixed:

a) a motor (32) able to rotate an axial rod (30) equipped, in said conical part (18), with mixing or stirring blades (36) and in said cylindrical part (20) with an Archimedean screw (38), whose pitch is such that it opposes descent of said ice balls (40) by gravity when rotated by said motor and, therebetween, a means for sealing passage of said ice balls between said conical part and said cylindrical part, b) a jack (34) able to control a translation of the axial rod (30) along the length thereof in order to displace the sealing means (40) between a bottom position sealing passage of said ice balls and a top position opening said passage, a gun (4) for projecting said ice balls by compressed air action, whose inlet of pipe (52) is connected to outlet (58) of the injection chamber, a compressed air source (6) supplying air at two pressures, one air pressure being low and the other air pressure being high, the low pressure compressed air being supplied by a first duct (56) to an inlet of the injection chamber and the high pressure compressed air being supplied by a second duct (54) to an inlet of the gun, on the gun, a double contact trigger (60), whereof a first contact controls injection of said low and high pressure compressed air and whereof a second contact, which is operable subsequent to said first contact, controls said jack (34) for raising said axial rod (30) and rotation of said motor (32).

* * * * *